United States Patent [19]

Nuccel

[11] 3,708,099
[45] Jan. 2, 1973

[54] NOZZLE WELDER
[75] Inventor: Albert W. Nuccel, Harrisburg, Pa.
[73] Assignee: Teledyne, Inc., York, Pa.
[22] Filed: Dec. 21, 1970
[21] Appl. No.: 100,040

[52] U.S. Cl. .....................228/29, 219/125, 228/32, 228/45
[51] Int. Cl. .............................................B23k 1/00
[58] Field of Search ........228/25, 29, 45, 32; 29/157; 219/124, 125 R, 125 TP, 125 PL, 126

[56] References Cited

UNITED STATES PATENTS

| | | | |
|---|---|---|---|
| 2,216,033 | 9/1940 | Hopkins | 29/157 C |
| 2,416,384 | 2/1947 | Gibson | 228/45 |
| 2,749,421 | 6/1956 | Mikulak et al. | 228/45 |
| 2,777,937 | 1/1957 | Bryant | 219/125 TP |
| 3,215,812 | 11/1965 | Smith | 219/125 |

Primary Examiner—J. Spencer Overholser
Assistant Examiner—R. J. Craig
Attorney—Luke A. Mattare, James W. Dent and John S. Smith

[57] ABSTRACT

A nozzle welder self supported on a nozzle that is arranged to be circumferentially welded in an opening in the wall of a cylindrical vessel, the nozzle welder body being mounted for rotation on the nozzle and being provided with welding head support means arranged to be horizontally and vertically adjustable for orienting and maintaining the welding head in the circumferential weld groove between the nozzle and cylindrical vessel as the nozzle welder rotates.

9 Claims, 13 Drawing Figures

INVENTOR.
ALBERT W. NUCCEL

INVENTOR.
ALBERT W. NUCCEL

INVENTOR.
ALBERT W. NUCCEL 3,708,099

NOZZLE WELDER

BACKGROUND OF THE INVENTION

Conventionally the customary forms of nozzle welders for welding of nozzles to large cylindrical pressure vessels are supported on the end of the movable ram of a manipulator, the manipulator moving the nozzle welder into position with respect to a nozzle to be welded and retaining it in position while the nozzle welder operates to weld the circular groove between the nozzle and the cylindrical pressure vessel. Such manipulators or other prior means for supporting the nozzle welders are massive and expensive pieces of equipment and are tied up during the welding operation. Furthermore, they occupy considerable space in the vicinity of the nozzle welding operation.

Accordingly, one object of the present invention is to provide an improved nozzle welder that is portable and adapted to be supported on the nozzle that is to be welded and that dispenses with the use of extraneous or outside apparatus, such as manipulators, for moving the nozzle welder into position with respect to the pressure vessel and for supporting the nozzle welder in proper welding position during the welding operation. Additionally, it does not tie up such expensive and massive equipment during the welding operation.

Difficulties have been experienced in the past in making internal nozzle welds, to provide means for reaching into cylindrical pressure vessels, particularly where the nozzles that are to be welded are disposed a considerable distance from the ends of the vessel, and for supporting the nozzle welder in proper welding position during the welding operation. Difficulties have also been previously experienced to provide means for reaching and supporting the nozzle welder in proper welding position for external welding of nozzles on extremely large diameter vessels.

Since the nozzle welder of the present invention does not require any extraneous or outside apparatus for holding the nozzle welder in proper welding position during the welding operation, the nozzle welder is adapted to be located in positions not previously readily accessible by conventional nozzle welder supporting means.

SUMMARY OF THE INVENTION

The apparatus of the present invention includes a vertical drive shaft that is rigidly but removably secured at one end, as by clamping or chuck means on an end of the nozzle that is to be circumferentially welded in the side wall of a cylindrical pressure vessel, the nozzle being preliminarily tack welded in position on the cylindrical vessel. The free upper end of the drive shaft has rigidly mounted thereon a sun gear. The nozzle welder includes a cylindrical elongated housing surrounding the drive shaft and that supports drive means for planetary gearing carried by the nozzle welder body, which planetary gearing meshes with the sun gear for rotating the nozzle welder body about the axis of the nozzle welder drive shaft. A horizontal arm is secured to and extends laterally from the welder body housing for rotation therewith and an upright welding head support member is carried by the laterally extending arm for adjustable movement therealong and for adjustable vertical movement relative thereto whereby to orient and maintain a welding head carried by the lower end of welding head support member in the weld groove between the nozzle and the vessel as the nozzle welder rotates about its stationary drive shaft to deposit successive weld beads.

The various objects and advantages of the invention will be hereinafter pointed out or will become apparent from the following description when read in conjunction with the accompanying drawings illustrating a preferred embodiment of the invention.

Figures 1, 11:
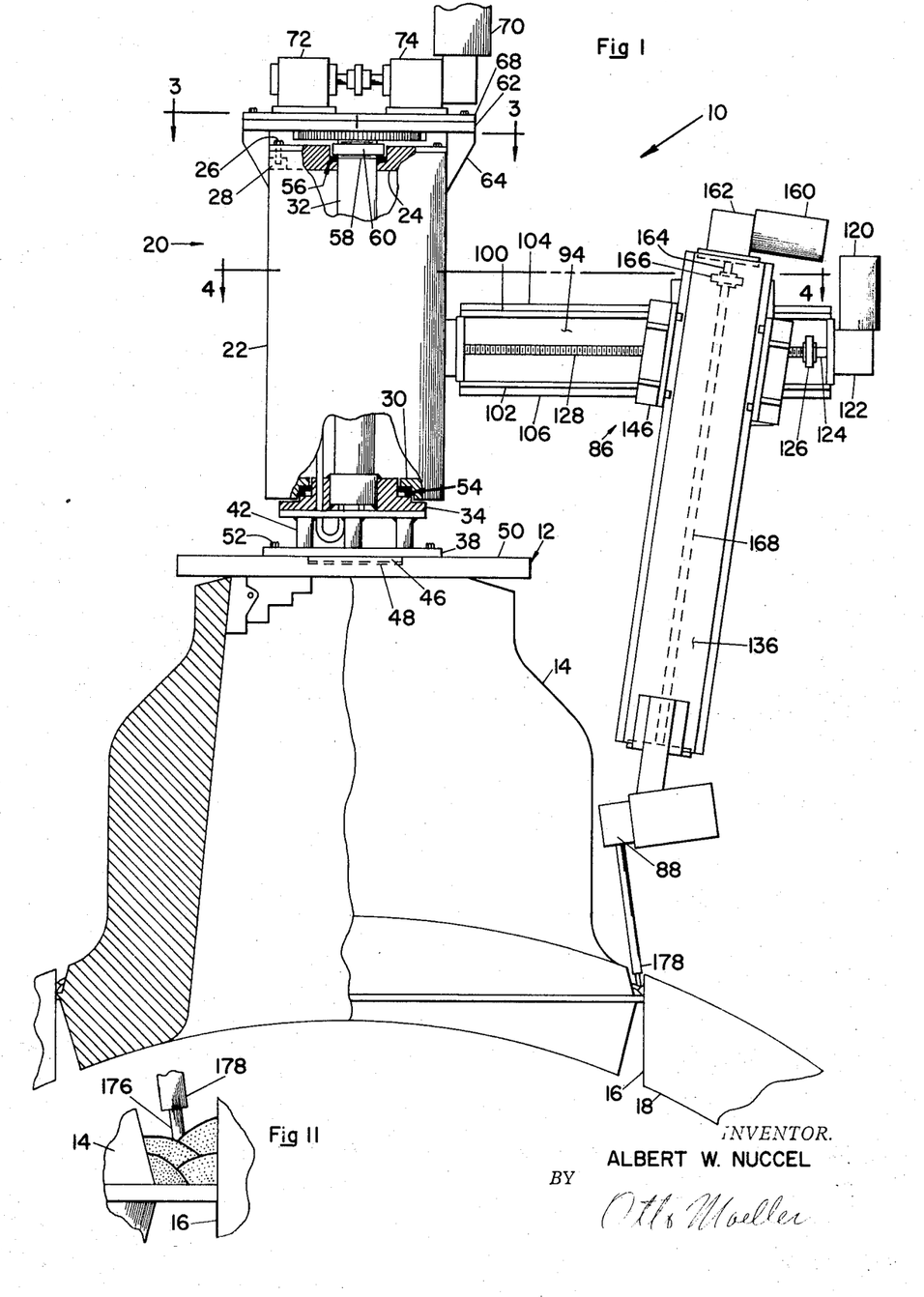
FIG. 1 is a view in elevation of the nozzle welder with parts broken away and shown in section, with the pressure vessel to which the nozzle is to be welded shown fragmentarily.
FIG. 11 is an enlarged view of a portion of FIG. 1 showing the weld beads in the weld groove between the nozzle and the cylindrical pressure vessel.

Referring particularly to FIG. 1, the portable self-supported circular or nozzle welder, indicated as a whole by the reference numeral 10, is shown self-supported by means of a clamping or chuck means 12 which clamps the circular welder 10 onto the workpiece, in the present instance a nozzle 14, that is to be circumferentially welded in a circular opening 16 in the wall of a large cylindrical pressure vessel or shell 18, as for example, the shell of a reactor. A number of such nozzles 14 may be disposed at various points around the circumference of the pressure vessel 18, and the nozzle welder 10 is portably designed so that it can readily be moved, for example, by an overhead crane (not shown) for attachment directly to the top of the nozzle to be welded as shown in FIG. 1, or to the bottom of the nozzle for internal weldment, as shown in FIG. 11. The nozzle 14 is preliminarily tack welded in position prior to securing the nozzle welder 10 thereto.

Figure 2:
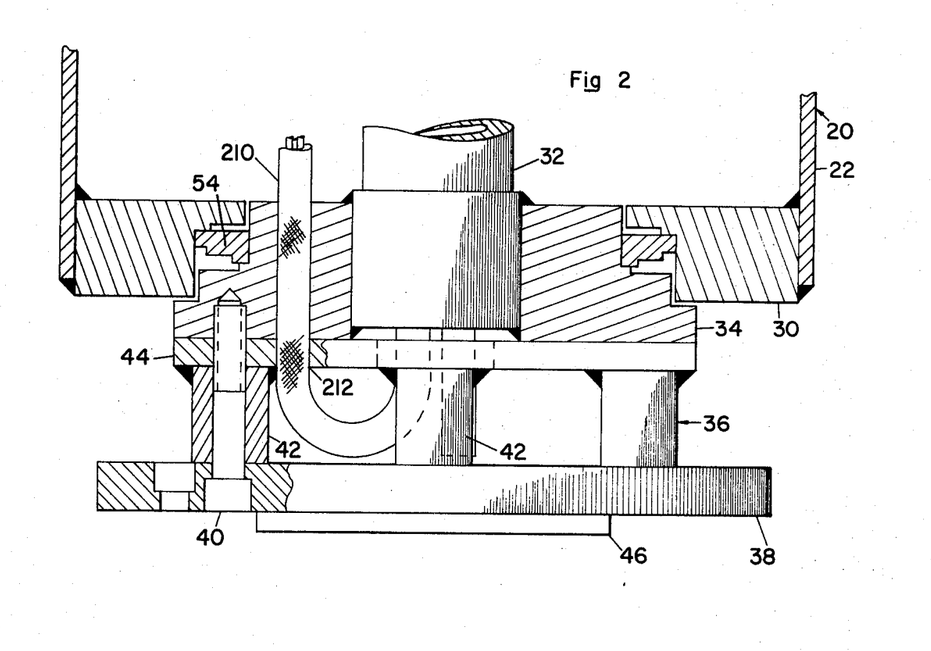
FIG. 2 is an enlarged sectional view of the lower end portion of the nozzle welder shown in FIG. 1.
Figure 3:
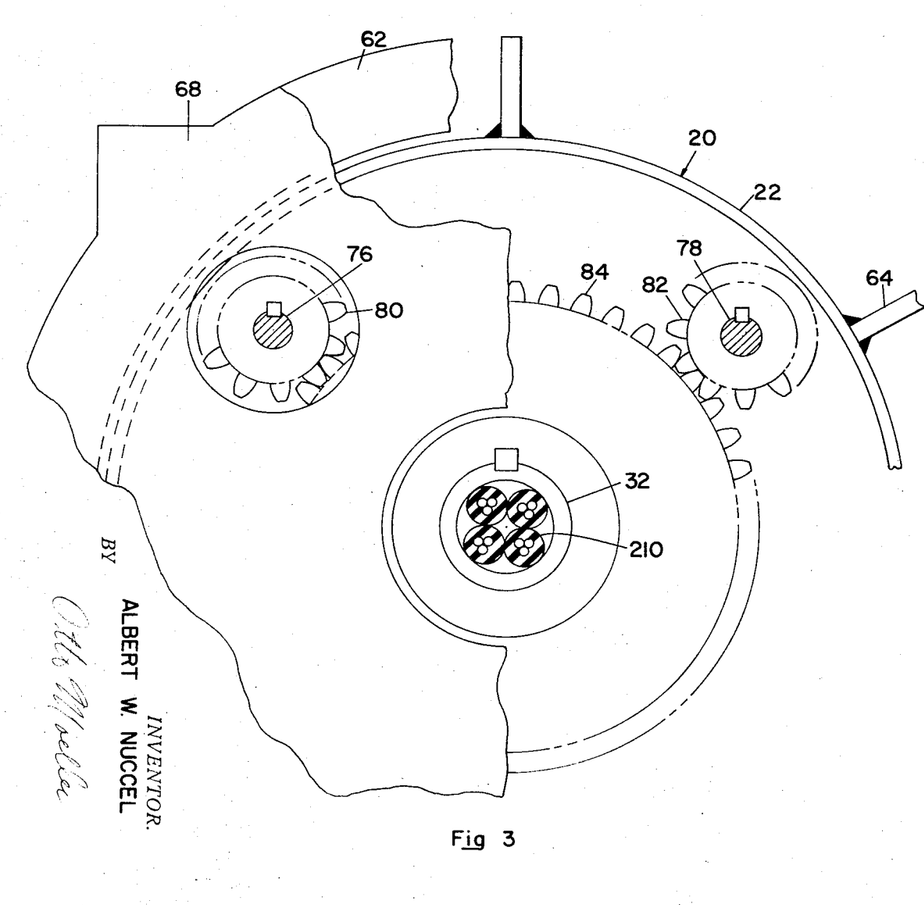
FIG. 3 is a section view taken on the irregular line 3—3 of FIG. 1.

The nozzle welder 10 includes a body 20 having an open ended upright cylindrical housing 22. The open upper end of housing 22 is provided with a cover plate 24 removably secured by a plurality of circumferentially spaced cap screws 26 extending through the cover plate 24 and threaded into an annular boss 28 welded or otherwise secured to the upper inner end of the cylindrical housing 22; and the open lower end of the housing 22 is provided with an annular bottom plate 30, welded or otherwise secured to the inner lower end of the cylindrical housing 22. The nozzle welder body 20 is mounted for rotation about its vertical axis on a fixed tubular vertical shaft 32. The lower end of the tubular shaft 32 is received in and secured, as by welding, in a bearing plate 34, which in turn is rigidly supported through an interposed spacer 36 on an adapter plate 38 by means of a plurality of circumferentially spaced cap screws 40 extending upwardly through the adapter plate 38, the posts 42 and the top annular plate 44 of the spacer 36, and threaded into the bearing plate 34, as best shown in FIG. 2.

The adapter plate 38 is provided on its under side with a depending shallow circular boss 46 adapted to be snugly received in a circular recess 48 in the top face of the chuck plate 50 for centering the shaft 32 on the chuck means 12. A plurality of circumferentially spaced cap screws 52 extending vertically through the adapter plate 38 and threaded into the chuck plate 50 rigidly supports the shaft 32 of the nozzle welder body 20. Bearing means 54 between the annular bottom plate 30 and the bearing plate 34; and bearing means 56 disposed in a bore in the cover plate 24 and surrounding the shaft 32 provides means for rotatably mounting the body 20 on its shaft 32. The upper end of the shaft 32 is threaded as at 58 to receive a nut 60 which when drawn up against the bearing 56 clamps the body 20 and its shaft assembly in assembled relation.

The nozzle welder body 20 is provided with an annular plate 62 supported in spaced relation above the cover plate 24 by a plurality of circumferentially spaced ears 64 secured as by welding to and depending from the under side of the annular plate 62 and secured as by welding to the outer upper periphery of the welder body housing 22. Resting on and secured to the annular plate 62, as by a plurality of circumferentially spaced cap screws 66, is a drive mounting plate 68. Mounted on the drive mounting plate 68 is a motor 70 and a pair of cooperating speed reducer units 72 and 74. The speed reducer units 72 and 74 are offset radially of the extended axis of the shaft 32, and are provided with respective vertical output shafts 76 and 78 extending downwardly through the drive mounting plate 68 and having keyed on their projecting ends the planetary gears 80 and 82 that mesh with a sun gear 84 keyed to the upper end of stationary shaft 32 whereby the welder body 20 is rotated about its shaft 32.

A welding head orienting unit, indicated as a whole by reference numeral 86, for adjustably positioning the welding head 88 in desired relation with the seam or groove between the nozzle 14 and the vessel 18 adjacent the opening 16 in the latter that is to be welded, extends substantially horizontally to one side of the nozzle welder body 20.

Figures 4, 5:
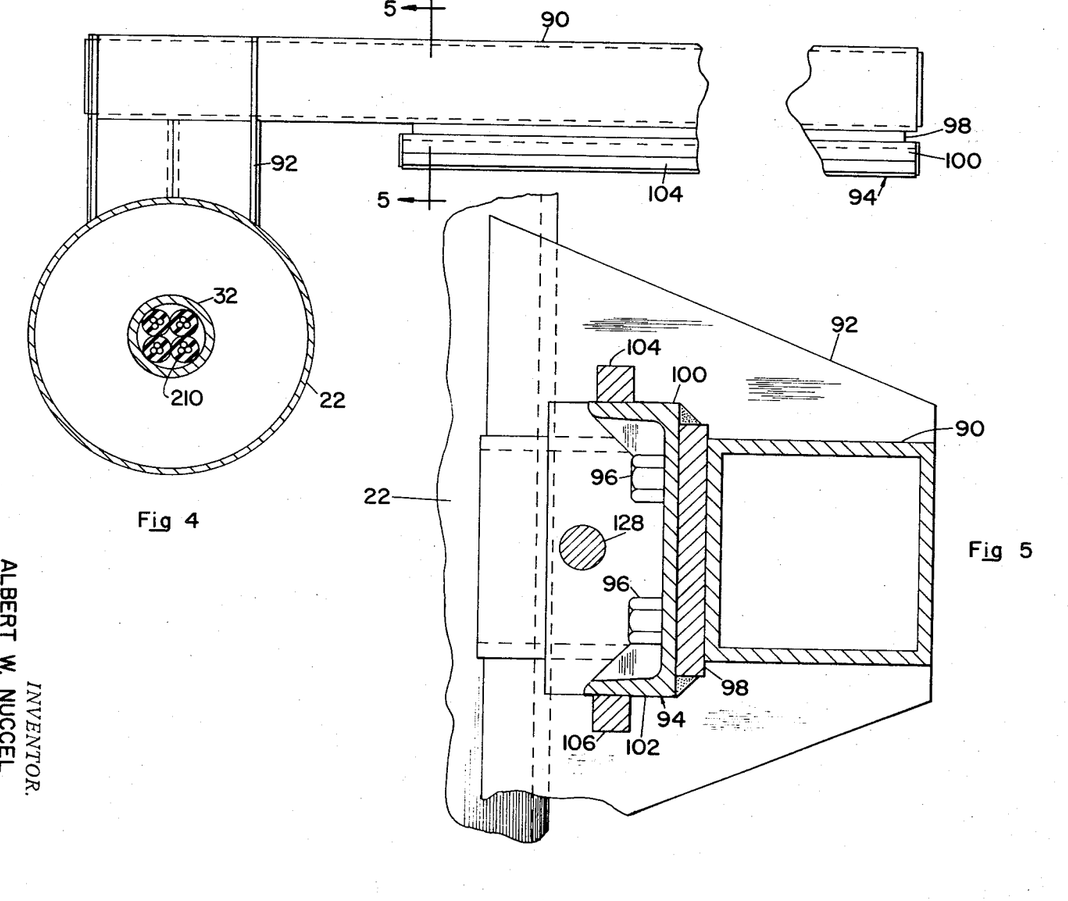
FIG. 4 is a sectional view taken on line 4—4 of FIG. 1.
FIG. 5 is a sectional view taken on line 5—5 of FIG. 4.

The welding head orienting unit 86 includes an elongated tubular support frame 90, generally rectangular in cross section as best shown in FIGS. 4 and 5, that at one end is rigidly secured by bracket means 92 to the nozzle welder body 20 and extends horizontally to one side thereof. A horizontally extending arm in the form of an elongated forwardly opening channel member 94 is removably secured to the forwardly facing side of the support frame 90 by a plurality of upper and lower spaced cap screws 96. A stiffener plate 98 is preferably interposed between the support frame 90 and the channel member 94, the plate 98 being welded to the channel member 94.

Figure 7:
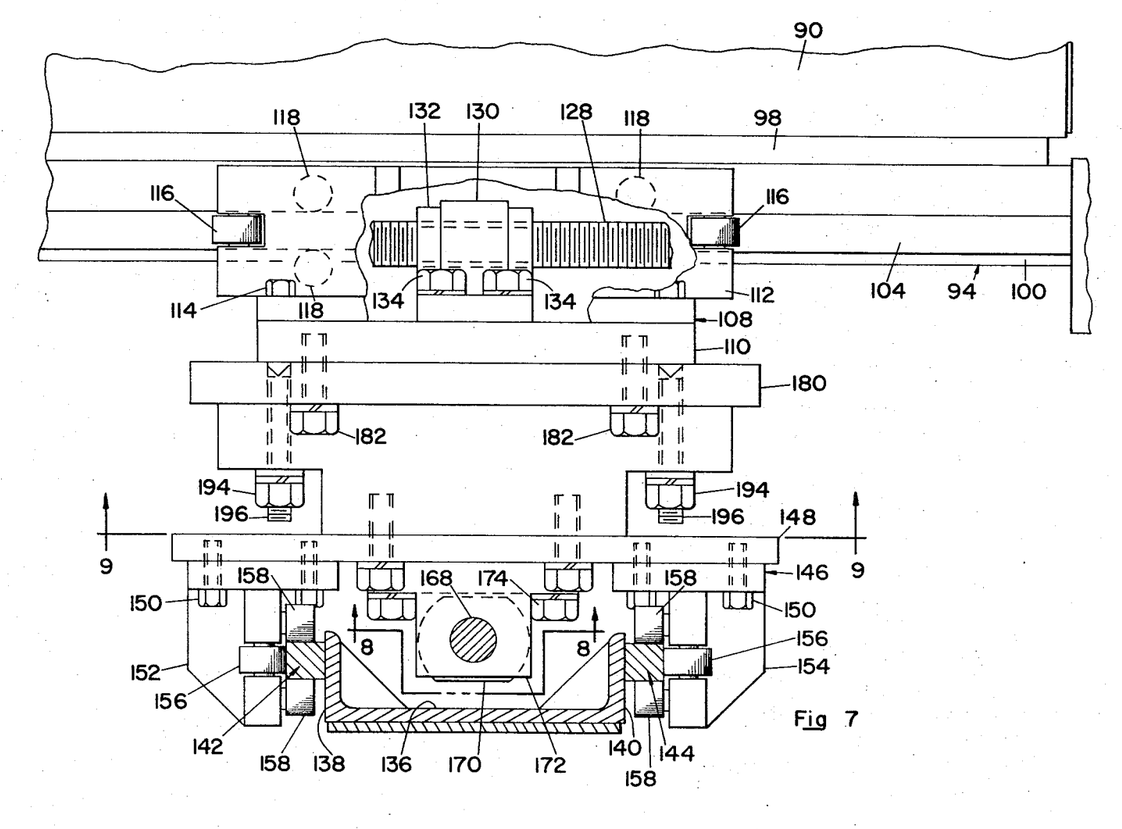
FIG. 7 is a sectional view taken on line 7—7 of FIG. 6.

The channel member 94 has rigidly secured to the outer sides of its upper and lower flanges 100 and 102 adjacent the free edges thereof, respective upper and lower tracks 104 and 106 rectangular in cross section and extending substantially the length of the channel member 94, all as best shown in FIGS. 1, 4, 5 and 7. A carriage 108 is mounted for horizontal movement along the tracks 104 and 106 of the channel member 94. The carriage 108 includes a rectangular mounting plate 110 to which, as best shown in FIG. 7, is secured an upper roller supporting bracket 112 by suitable means such as by cap screws 114. The upper bracket 112 includes adjacent each end a top roller 116 engaging the top face of the upper track 104 and includes a pair of side rollers 118 near each end engaging the opposite sides of the upper track 104. A lower bracket, not shown, similar in all respects to the upper bracket 112, is secured to the mounting plate 110, and is provided with bottom rollers similar to top rollers 116 and side rollers similar to side rollers 118, engaging the bottom face and opposite sides of the lower track 106. The rollers 116 and 118 cooperate with the upper and lower tracks 104 and 106 to guide the carriage 108 in its movement along the channel member 94.

The means for moving the carriage 108 along the channel member 94 includes a motor 120 and a cooperating speed reducer 122 mounted on the free end of channel member 94. The output shaft 124 of the speed reducer 122 is connected by a flexible coupling 126 to one end of a drive screw 128 extending longitudinally through the channel member 94 and suitably mounted for rotation in the opposite end thereof. A nut 130 is carried by and threadedly engages the screw 128. The nut 130 is disposed in a housing 132, and is so configured as to preclude relative rotation therebetween to provide a jackscrew means. The housing 132 is removably secured by cap screws 134 to mounting plate 110 of the carriage 108 so that as the drive screw 128 is rotated in one direction or the other, the nut 130, nut housing 132 and consequently the carriage 108 travels along the length of the screw 128 in one direction or the other.

The welding head orienting unit 86 also includes a welding head support in the form of an elongated rearwardly opening channel member 136 supported in upright position, through means to be described, by the channel member 94 for movement horizontally therealong and for vertical movement relative thereto. The channel member 136 had rigidly secured to the outer sides of its left and right hand flanges 138 and 140 adjacent the free edges thereof, respective left and right hand tracks 142 and 144 rectangular in cross section and extending substantially the length of the channel member 136. The channel member 136 is mounted for vertical movement in a carriage 146, which in turn is rigidly but adjustably supported by the carriage 108, by means to be described, for limited pivotal movement about a horizontal axis.

Figure 6:
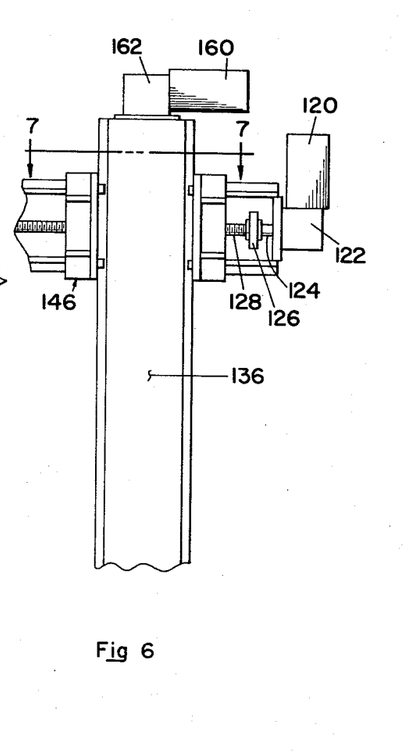
FIG. 6 is a fragmentary view of the welding head support of FIG. 1 but shown in an adjusted vertical position.

The carriage 146 includes a rectangular mounting plate 148 to which, as best shown in FIGS. 1, 6 and 7, is secured by suitable means such as cap screws 150, a left hand roller supporting bracket 152 and a right hand supporting bracket 154. The left hand bracket 152 is provided adjacent its upper end and its lower end with a roller 156 engaging the end face of the track 142, and is also provided near each of the said ends with a pair of side rollers 158 engaging the opposite sides of the track 142. The right hand bracket 154 is similar in all respects to the left hand bracket 152 and is provided with similar rollers 156 and 158 engaging the track 144. The rollers 156 and 158 cooperate with the tracks 142 and 144 to guide the channel member 136 in its vertical movement in the carriage 146.

Figure 8:
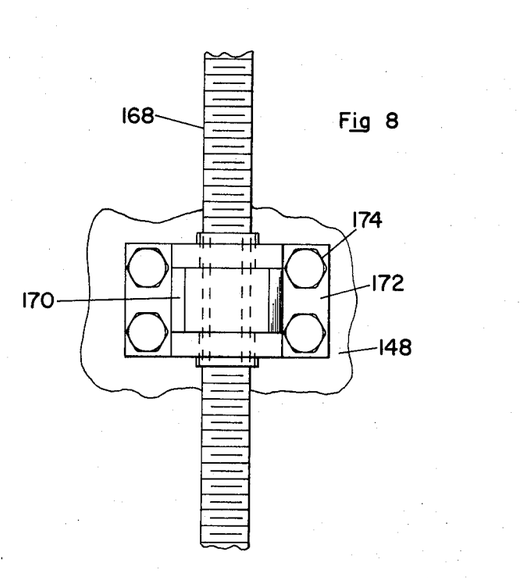
FIG. 8 is a sectional view taken on irregular line 8—8 of FIG. 7.

The means for vertically moving the channel member 136 includes a motor 160 and a cooperating speed reducer 162 mounted on the upper end of the channel member 136. The output shaft 164 of the speed reducer 162 is connected by a flexible coupling 166 to the upper end of a drive screw 168 extending longitudinally through the channel member 136 and suitably mounted for rotation in the lower end thereof. As best shown in FIGS. 7 and 8, a nut 170 is disposed in a housing 172 and is so configured as to preclude relative rotation therebetween to provide a jack screw means. The housing is rigidly but removably secured by cap screws 174 to the mounting plate 148 of the carriage 146 so that as the drive screw 168 is rotated in one direction or the other, it moves upwardly or downwardly in the nut 170 and consequently moves the channel member 136 upwardly or downwardly. Carried by the lower end of the channel member 136 is the previously referred to welding head 88, which may be of any suitable conventional and well known construction, and is therefore not shown in detail. A welding wire 176 extends from the nozzle 178 of the welding head 86, and is fed to the head 86 from a reel and suitable feeding means well known in the art and therefore is not shown in the drawings.

It will be seen from the above description that by horizontally adjusting the position of the carriage 108 along the channel member 94 at desired distances from the body 20 of the nozzle welder 10, thereby horizontally moving the welding head support channel member 136 toward or away from the body 20, the welding head 88 may be located to weld nozzles 14 of varying diameters to the vessel or shell 18 as the nozzle welder 10 rotates about its shaft 32. By vertically adjusting the position of the welding head support channel member 136 in its carriage 146, the welding head 88 may be positioned to weld nozzles 14 of varying heights. By manual or automatic control means the position of the welding is arranged to be adjusted after each circular welding pass to provide successive overlapping weld beads in the groove between the nozzle 14 and the shell 18 to build up the desired weld seam.

While the carriage 146 may be rigidly and directly secured to the carriage 108, by suitable means such as by cap screws (not shown) extending through the confronting mounting plates 148 and 110 of the carriages 146 and 108, means is preferably provided, as previously mentioned, interposed between the carriages 146 and 108 for adjustment of the channel member 136 for limited movement about a horizontal axis normal to the axis of the channel member 136, as for example between a position as shown in FIG. 6 and a position as shown in FIG. 1.

Figure 9:
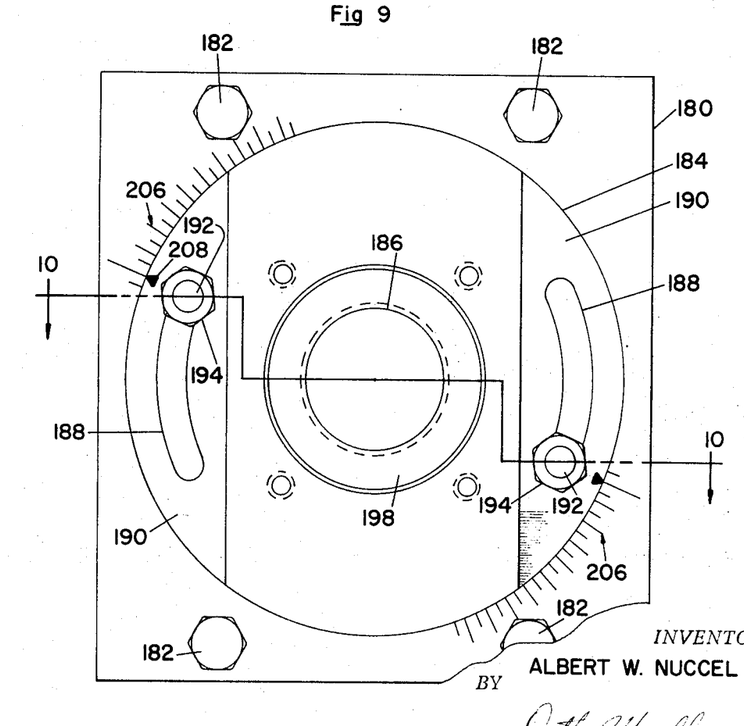
FIG. 9 is a sectional view taken on line 9—9 of FIG. 7.
Figure 10:
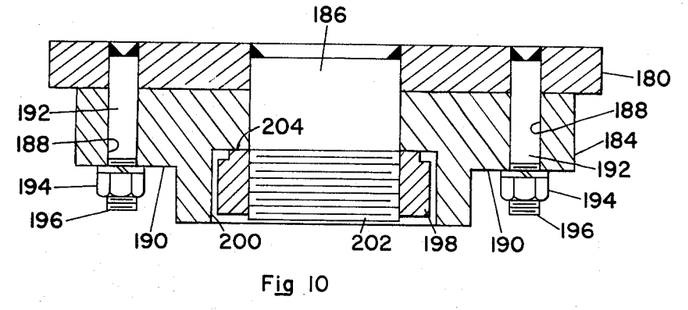
FIG. 10 is a sectional view taken on line 10—10 of FIG. 9.

Referring particularly to FIGS. 7, 9 and 10, the means for angularly adjusting the channel member 136 includes a rectangular back pivot plate 180 in confronting facial engagement with and rigidly secured to the mounting plate 110 by cap screws 182. A pivot disc plate 184 is rotatably mounted for pivotal adjustment on a stub shaft 186 extending axially through the disc plate 184 and into the back pivot plate 180 to which it is rigidly secured, as by welding. The pivot disc plate 184 has diametrically opposed curved slots 188, centered on the axis of the stub shaft 186 and disposed in the depressed segmental portions 190 of the pivot disc plate 184. Bolts 192 extend through the slots 188 into the back pivot plate 180 to which they are rigidly secured, as by welding. The disc plate 184 can thus be pivotally adjusted to any one of a number of angular positions about the axis of the stub shaft 186 within the limits of the slots 188, and can be secured in such adjusted position by drawing up the nuts 194 on the threaded projecting ends 196 of the bolts 192. A retainer nut 198 is preferably employed that is disposed in a counterbore 200 in the outer end of the disc plate 184 and is threaded on the threaded end portion 202 of the stub shaft 186 with a slight clearance between the confronting face portions of the nut 198 and the shoulder 204 of the disc plate 184 formed by the counterbore 200. Stationary scales 206 carried by the back pivot plate 180 together with the pointers 208 on the adjustable pivot disc plate 184 indicates the particular angularity of the channel member 136 as it is rotated from the position shown in FIG. 7 to an angular position such as shown in FIG. 1.

By means of such angular adjustment of the upright welding head supporting channel member 136, the welding head may be disposed closer to the axis of the nozzle welder body 20 whereby to produce circular welds of extremely small diameter, to weld for example nozzles of small diameter. Additionally, such angular adjustment permits greater flexibility in disposing the welding head in grooves of varying angles and providing for greater flexibility in properly aligning the welding head in the weld grooves between odd shaped nozzles and the vessel or shell to which they are to be welded.

Cables 210 leading from suitable sources of current extend into the open upper end of the tubular shaft 32, through the shaft 32, then out through the open lower end thereof and upwardly through openings 212 in the stationary bearing plate 34 into the housing 22 to conventional collector rings (not shown) secured to and encircling the stationary tubular shaft 32. Electrical lines (not shown) lead from conventional brushes (not shown) secured to the inner wall of the rotatable housing 22 to the welding head 88 and the various motors referred to above.

Figure 12:
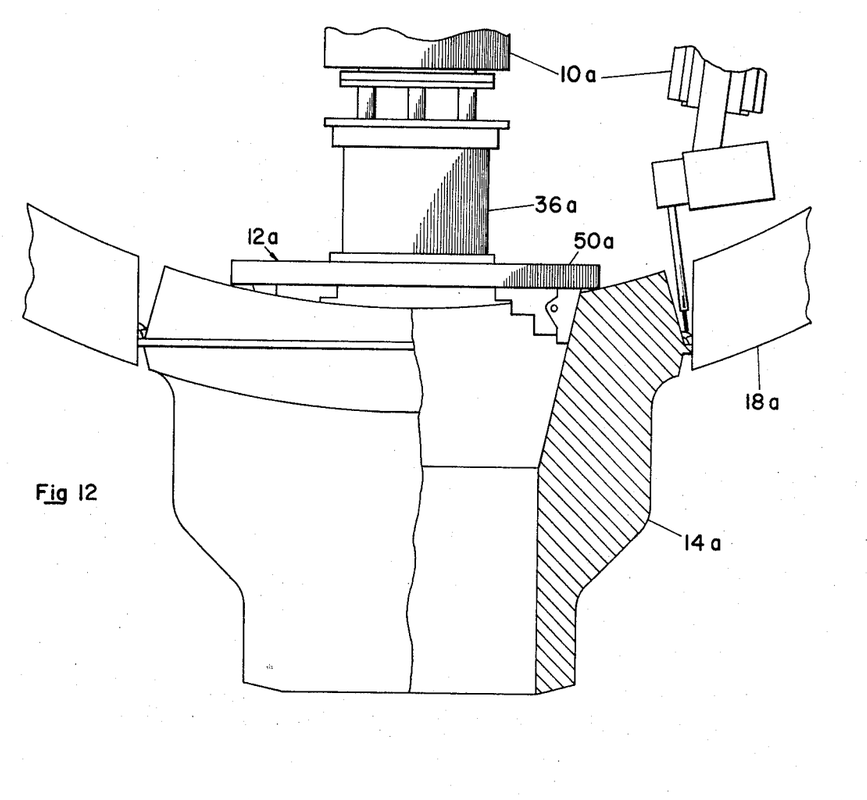
FIG. 12 is a fragmentary view of the nozzle welder shown applied to the nozzle for interiorly welding the nozzle to cylindrical vessel.
Figure 13:
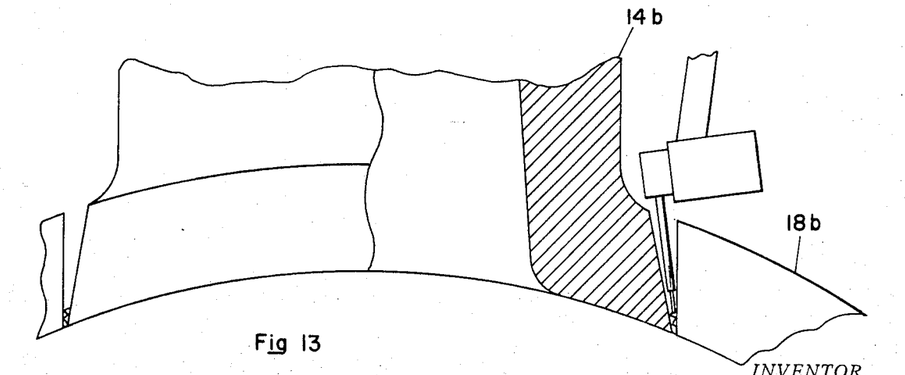
FIG. 13 is a fragmentary view of the nozzle welder for welding a modified form of welding groove.

In FIG. 11 there is shown fragmentarily a nozzle welder 10a identical in all respects to the nozzle welder 10, except that it is provided with a modified spacer 36a of greater height than the spacer 36, the nozzle welder 10a being disposed inside the vessel or shell 18a and being rigidly attached to the bottom of the nozzle 14a for internal welding. The nozzle 14, as shown in FIG. 1, may be externally welded and the weld completed by internal welding as shown in FIG. 11. In FIG. 12, the nozzle 14b and vessel or shell 18b are shown with the groove therebetween arranged to be welded entirely by external welding.

Although I have disclosed an exemplary embodiment of my invention herein, it will be understood that various changes, modifications and substitutions may be incorporated in such embodiment without departing from the spirit of the invention.

Having described my invention, I claim:

1. A self supported nozzle welder for welding a nozzle that has been tack welded in the wall of a cylindrical vessel having an opening for receiving an end of the nozzle and forming therewith a weld groove of substantial depth comprising:
   a. a drive shaft;
   b. means rigidly supporting said drive shaft in upright position on an end of said nozzle;
   c. an elongate, vertical housing surrounding said drive shaft and supported thereby for axial rotation;
   d. drive means operatively connecting the drive shaft with said housing for rotating the housing;
   e. a horizontal arm secured at one end to said housing and extending laterally from said housing for rotation therewith;
   f. an upright welding head support member carried by said horizontal arm between the ends thereof;
   g. a welding head carried by the lower end of said upright welding head support member; and
   h. means for moving said welding head support member horizontally along said horizontal arm and means for moving said welding head support member in an upward or downward position relative to said horizontal arm to orient and maintain said welding head in proper welding position in said weld groove as said nozzle welder rotates about its said drive shaft.

2. The nozzle welder of claim 1, including means pivotally mounting the upright welding head support member on a horizontal axis for moving said welding head toward and away from the axis of said nozzle, and means securing said welding head support member in any one of a number of adjusted positions.

3. The nozzle welder of claim 1 wherein said drive means includes a sun gear stationarily mounted on the upper end of said rigidly supported drive shaft, a motor supported by said housing, and planetary gearing carried by said housing operatively connected with said motor and engaging said sun gear for planet-wise movement thereabout to rotate said housing axially about said rigidly supported drive shaft.

4. The nozzle welder of claim 1, including clamping means rigidly securing said drive shaft on the outer end of said nozzle to locate said nozzle welder outside said cylindrical vessel for external welding of said nozzle to said cylindrical vessel.

5. The nozzle welder of claim 1, including clamping means rigidly securing said drive shaft on the inner end of said nozzle to locate said nozzle welder inside said cylindrical vessel for internal welding of said nozzle to said cylindrical vessel.

6. A nozzle welder for welding the circular base of a nozzle in an opening in the wall of a cylindrical pressure vessel, the nozzle base and pressure vessel forming between them a welding groove of substantial depth, comprising
   a. a drive shaft;
   b. means rigidly and removably supporting said drive shaft in vertical position on an end of said nozzle;
   c. an elongated, vertical housing surrounding said drive shaft and supported thereby for rotation about the axis of said shaft;
   d. drive means including a motor mounted on said housing operatively connecting said drive shaft with said housing for rotating the housing;
   e. a horizontal arm secured at one end to said housing and extending laterally from said housing for rotation therewith;
   f. a first carriage mounted for horizontal reciprocating movement along said horizontal arm;
   g. a second carriage carried by said first carriage for movement therewith;
   h. an upright elongated welding head support member mounted for vertical reciprocating movement in said second carriage;
   i. a welding head carried by the lower end of said upright welding head support member; and
   j. means for moving said first carriage along said horizontal arm and means for moving said welding head support member vertically in said second carriage to orient and maintain said welding head in said weld groove as said nozzle welder rotates about its said drive shaft.

7. The nozzle welder of claim 6, including means pivotally mounting said second carriage to said first carriage on a horizontal axis for swinging said upright welding head support to any one of a number of adjusted positions for varying the radius of the circular orbit of rotation of said welding head.

8. A nozzle welder for welding the circular base of a nozzle in an opening in the wall of a cylindrical pressure vessel, the nozzle base and pressure vessel forming between them a welding groove of substantial depth, comprising:
   a. a drive shaft;
   b. means rigidly supporting said drive shaft in upright position on an end of said nozzle;
   c. a vertical housing surrounding said drive shaft and supported thereby for rotation about the axis of said shaft;
   d. drive means including a motor mounted on said housing operatively connecting said drive shaft with said housing for rotating the housing;
   e. an arm secured at one end to said housing and extending laterally from said housing for rotation therewith;
   f. a first carriage mounted for reciprocating movement along said arm;
   g. a second carriage carried by said first carriage for movement therewith;
   h. an upright welding head support member mounted for reciprocating movement in said second carriage;
   i. a welding head carried by the lower end of said upright welding head support member; and
   j. drive means including a motor carried by said laterally extending arm for effecting reciprocating movement of said first carriage therealong and drive means including a motor carried by said welding head support member for effecting reciprocating movement of said welding head support member in said second carriage to orient and maintain said welding head in said weld groove for depositing successive weld beads as said nozzle welder rotates about its said drive shaft.

9. The nozzle welder of claim 8 wherein the drive means for reciprocating said first carriage includes a screw supported by and extending longitudinally of said arm and a nut member threadedly engaging said screw non-rotatively supported by said first carriage, and wherein the drive means for reciprocating said welding head support member includes a screw supported by and extending longitudinally of said welding head support member and a nut member threadedly engaging said last named screw non-rotatively supported by said second carriage.

* * * * *